UNITED STATES PATENT OFFICE.

CLARK O. BERRY, OF WICHITA, KANSAS.

NUT-LOCK.

1,198,181.  Specification of Letters Patent.  Patented Sept. 12, 1916.

Application filed June 27, 1916. Serial No. 106,199.

*To all whom it may concern:*

Be it known that I, CLARK O. BERRY, a citizen of the United States, residing at Wichita, in the county of Sedgwick and State of Kansas, have invented certain new and useful Improvements in Nut-Locks; and I do hereby declare the following to be a full, clear and exact description of the invention, such as will enable others skilled in the art to which it appertains to make and use the same.

This invention has for its object to provide a simple and effective nut lock which may be conveniently applied to use and which shall have an exceptionally wide range of adjustment.

With this and other objects in view, the invention consists in the novel construction, combination, and arrangement of parts as will be hereinafter specifically described, claimed, and illustrated in the accompanying drawing, in which:

Figure 1 represents a side elevation of the nut, constructed in accordance with this invention, Fig. 2 represents a transverse sectional view through a bolt, showing the nut partly in section, Fig. 3 represents a fragmentary sectional view at right angles to Fig. 2, Fig. 4 represents a fragmentary diametrical sectional view through the nut, illustrating the interior construction thereof, and Fig. 5 represents a perspective view of the locking element detached.

Referring to the drawing in detail, wherein similar reference numerals designate corresponding parts throughout the several views, the numeral 5 indicates a nut of the preferred construction having the usual internally screw threaded bore 7 adapted to fit the external screw threads of a bolt 6, having the usual external screw threads. The nut 5 is formed with a radial opening 8 communicating with the bore 7 and having substantially T-shaped recesses 9 formed in the opposite walls thereof.

The locking element, designated generally by the numeral 10, is adapted to fit into the radial opening 8 and includes a body 11 having a pair of diverging spring arms 12 adapted, when the locking element is slipped into the opening 8 to be compressed and moved into parallel relation, as shown in Fig. 2. The spring arms 12 are formed with ratchet teeth 13 adapted to engage the recesses 9 in the walls of the opening 8 to lock the element 10 in operative position with relation to the bolt 6.

The inner surface of the body 11 is concave and formed with screw threads 14, which are of the same size but inclined or pitched oppositely to the internal screw threads of the nut 5 and are adapted to coöperate with the screw threads of the bolt 6 to lock the nut against rotation thereon.

In use, the nut 5 is advanced to the desired position upon the bolt 6 and the locking element 10 is subsequently slipped into the opening 8, the spring arms 12 being compressed and the teeth 13 engaging in the recesses 9, thereby firmly locking the element 10 in operative position. The screw threads 14 at the inner terminal of the locking element are adapted to fit the screw threads of the bolt. The pitch of the screw threads 14 tends to advance the nut in a direction opposite to that of the internal screw threads of the nut, and as a result of this opposition of the threads of the nut and threads of the locking element on the screw threads of the bolt, the nut is effectively locked against rotational movement in either direction.

What I claim is:

1. A nut lock comprising a nut, adapted to be fitted upon a bolt, having a radial opening communicating with the bore thereof and recesses formed in the wall of said opening; a locking element including a body adapted to engage in the recess of the nut; and a pair of spring retaining arms having ratchet teeth adapted to coöperate with the walls of the opening to lock the element against removal.

2. A nut lock comprising a nut, adapted to be fitted upon a bolt, having a radial opening communicating with the bore thereof; and recesses formed in the opposite walls of said opening; and a locking element including a body; screw threads upon the inner terminal thereof adapted to coöperate with the screw threads of the bolt to lock the nut against rotational movement thereon; a pair of spring arms carried by said body; and means carried by said spring arms adapted to engage in the recesses in the walls of said opening to lock the element against removal.

3. A nut lock comprising a nut, adapted to be fitted upon a bolt, having a radial opening communicating with the bore thereof and recesses formed in the opposed

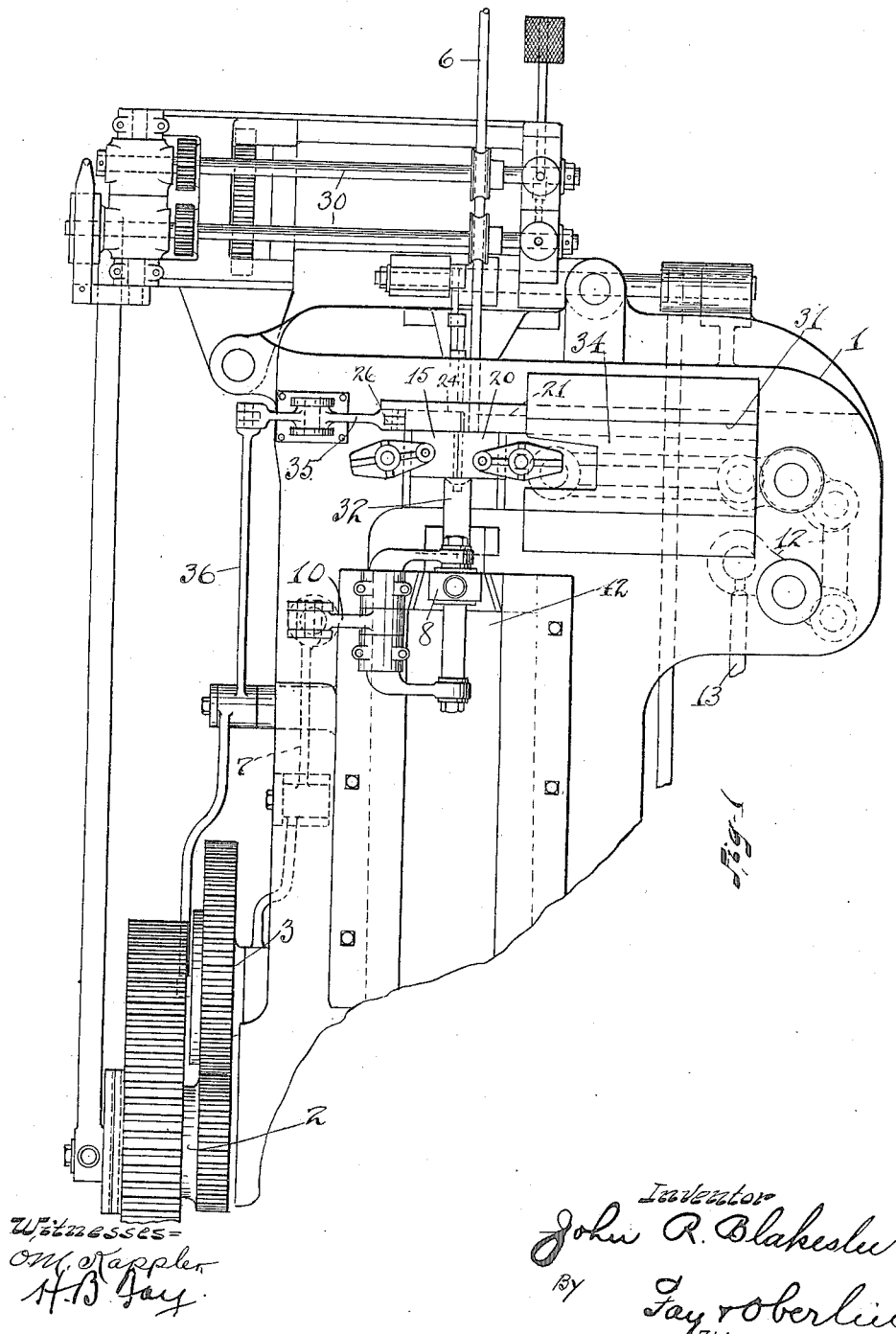

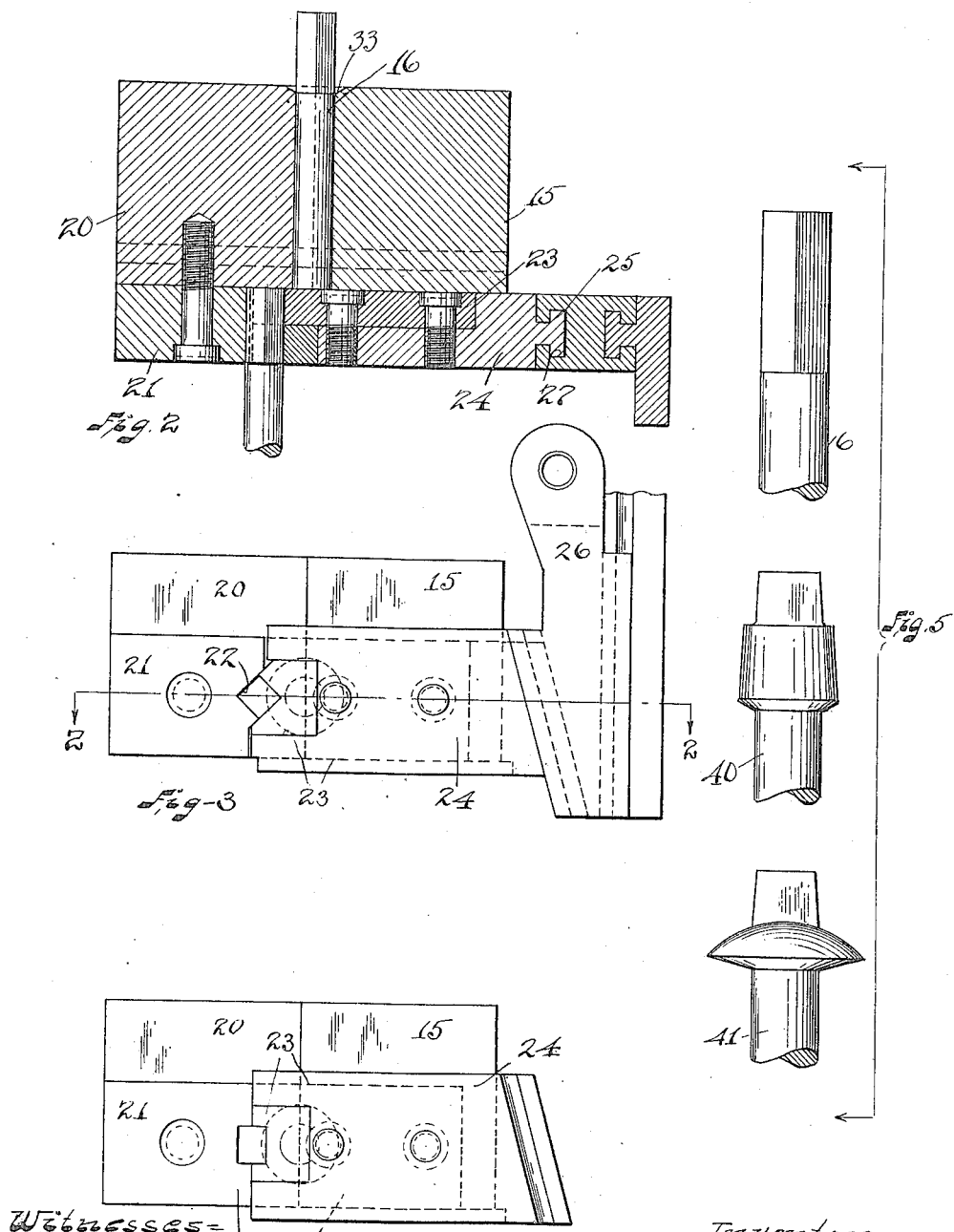

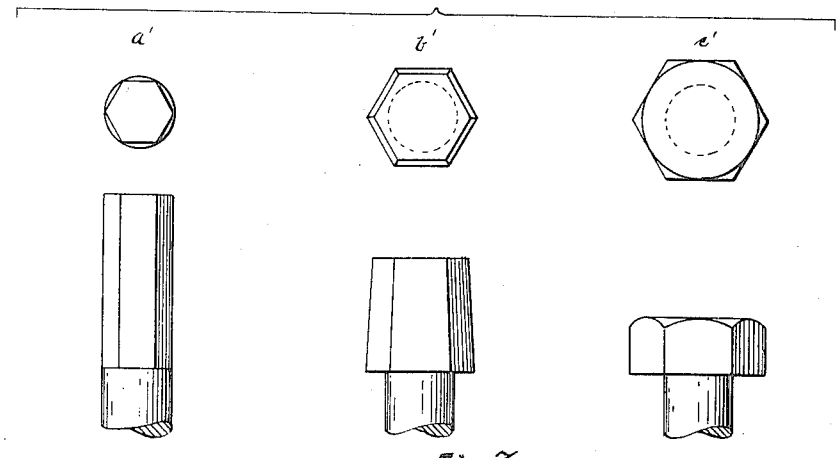
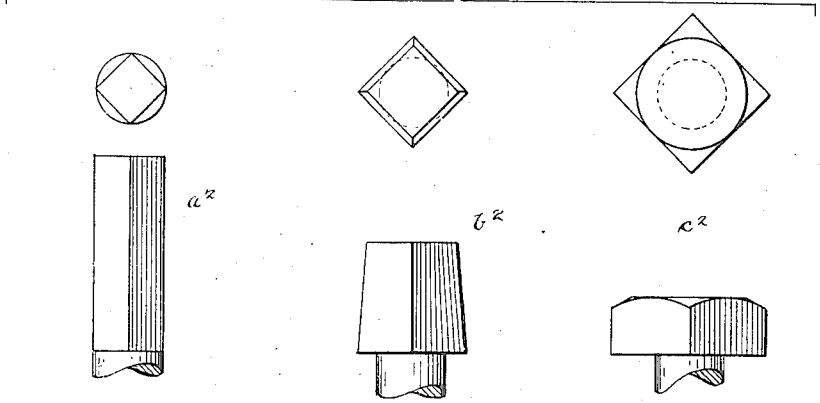

UNITED STATES PATENT OFFICE.

JOHN R. BLAKESLEE, OF CLEVELAND, OHIO, ASSIGNOR TO THE AJAX MANUFACTURING COMPANY, OF CLEVELAND, OHIO, A CORPORATION OF OHIO.

BOLT-MACHINE.

1,198,182.

Specification of Letters Patent.  Patented Sept. 12, 1916.

Application filed August 30, 1913. Serial No. 787,470.

*To all whom it may concern:*

Be it known that I, JOHN R. BLAKESLEE, a citizen of the United States, and a resident of Cleveland, county of Cuyahoga, and State of Ohio, have invented a new and useful Improvement in Bolt-Machines, of which the following is a specification; the principle of the invention being herein explained and the best mode in which I have contemplated applying that principle, so as to distinguish it from other inventions.

The subject of the present invention is a method of forming heads on bolts, screw spikes, and the like together with a suitable apparatus for carrying out my new and improved method, the method being described herein but being claimed in a co-pending divisional application filed April 16, 1915, Serial No. 842,242.

The screw spikes which are now used in such large quantities are preferably formed with a flanged head as in the old construction, and also with a nut on top of the head to facilitate the engagement of the bolt in the tie. The bolts are also threaded, but the threading is performed in a separate operation from those which will now be described, and hence need not be taken up at present.

It has been customary to form the spikes in two separate and distinct operations to secure the heading effect which has been described. This method of forming them takes considerable time, and it is impossible to turn out any large number in a day by this method. Accordingly, I have designed a new and improved method of forming the bolts by which the heading operation and the partial forming of the next bolt from the bar of stock are performed practically simultaneously being preceded slightly by the cutting off of the bolt which is to be headed from the bar of stock. By this method it is possible to greatly increase the number of bolts which can be made in a single machine in a day and the mechanism which I have provided for carrying out this method is in general so similar to the mechanism now used in the old process that it is not necessary to re-design or change to any great extent the forging machines which have hitherto been in use for this purpose. I have not therefore illustrated fully the various details of the machine which will be used to carry out the above method, but have merely illustrated the changes which have been made and the method of operating the forming and heading dies which are necessary to so form the spikes.

To the accomplishment of the foregoing and related ends said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a plan view showing more or less diametrically the lay-out of the machine and the general construction; Fig. 2 is a horizontal section on the line 2—2, illustrating the positions of the various dies at the moment of cutting off a partially formed track bolt; Fig. 3 is a side elevation showing the squeezing or forming dies together with the means for operating one of the same; Fig. 4 is a side elevation of a different form of squeezing die; Fig. 5 shows in side elevation the track bolt in various stages of its formation; and Figs. 6 and 7 show bolts or spikes in the several stages of manufacture as made by the present improved process.

Referring to Fig. 1, it will be seen that the machine is in general very similar to the machines which have hitherto been used for forming bolts, spikes, rivets and the like, the general construction of which is so well known that it is unnecessary to describe it in detail at this point. A suitable framework 1 is provided in which there is transversely disposed a main crank shaft 2 driven by any suitable means, such main shaft driving a secondary shaft 3, the latter being the shaft from which the various operating mechanisms are driven. The gripping and forming dies are suitably mounted in slideways 31 disposed transversely in the forward end of the machine, and of course operate simultaneously upon a bar of stock 6 which is fed into the forward end of the machine by any suitable feeding mechanism 30. Disposed at substantially right angles to the direction of movement of the gripping and forming dies are the heading dies or tools 32 of which there are two, such two dies being carried by the usual header slide 42 and being adapted to successively